(12) United States Patent
Pydin (10) Patent No.: US 12,464,965 B2
(45) Date of Patent: Nov. 11, 2025

(54) WORK AREA DETERMINATION DEVICE, LAWN MOWING SYSTEM, AND WORK AREA DETERMINATION METHOD

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 18/720,815

(22) PCT Filed: Dec. 21, 2021

(86) PCT No.: PCT/JP2021/047353
§ 371 (c)(1),
(2) Date: Jun. 17, 2024

(87) PCT Pub. No.: WO2023/119425
PCT Pub. Date: Jun. 29, 2023

(65) Prior Publication Data
US 2025/0063975 A1    Feb. 27, 2025

(51) Int. Cl.
*A01B 69/00* (2006.01)
*A01B 69/04* (2006.01)

(52) U.S. Cl.
CPC .................. *A01B 69/008* (2013.01)

(58) Field of Classification Search
None
See application file for complete search history.

(56) References Cited

U.S. PATENT DOCUMENTS

| | | | | |
|---|---|---|---|---|
| 2,598,873 A | * | 6/1952 | Zwiesler | A01D 69/007 56/242 |
| 3,045,413 A | * | 7/1962 | Sheffer | A01D 34/863 56/13.6 |
| 4,445,312 A | * | 5/1984 | Cartner | A01D 75/20 56/320.1 |
| 5,035,107 A | * | 7/1991 | Scarborough | A01D 43/16 56/13.6 |
| 5,040,360 A | * | 8/1991 | Meehleder | A01D 34/27 56/13.7 |

(Continued)

FOREIGN PATENT DOCUMENTS

| | | | | |
|---|---|---|---|---|
| AU | 1633299 A | * | 6/1999 | ............ A01D 43/14 |
| AU | 2010257460 A1 | * | 7/2011 | ........... A01D 34/008 |

(Continued)

OTHER PUBLICATIONS

International Search Report Corresponding to International Application No. PCT/JP2021/047353, issued Mar. 15, 2022, 3 pages.

*Primary Examiner* — Shelley Chen
(74) *Attorney, Agent, or Firm* — Rankin, Hill & Clark LLP (57) ABSTRACT

A work area determination device includes: an acquisition unit for acquiring a travel track of a lawn mower that has traveled while being operated by a person; a movement track calculation unit for calculating a movement track of the mowing blade of the lawn mower on the basis of the travel track; and a determination unit for determining a lawn mowing work area from which the obstacle presence area is excluded, on the basis of the movement track.

15 Claims, 11 Drawing Sheets

(56) References Cited

U.S. PATENT DOCUMENTS

| | | | | |
|---|---|---|---|---|
| 6,164,049 | A * | 12/2000 | Burch | A01D 43/14 56/16.8 |
| 9,516,806 | B2 * | 12/2016 | Yamauchi | G05D 1/0221 |
| 11,696,525 | B2 * | 7/2023 | Koto | A01D 34/008 701/23 |
| 2011/0166705 | A1 * | 7/2011 | Anderson | A01D 75/185 901/50 |
| 2015/0296707 | A1 | 10/2015 | Fukuda et al. | |
| 2016/0100522 | A1 * | 4/2016 | Yamauchi | G05D 1/0219 701/25 |
| 2019/0227561 | A1 | 7/2019 | Hiramatsu | |
| 2020/0037498 | A1 | 2/2020 | Ko et al. | |
| 2020/0375095 | A1 * | 12/2020 | Koto | A01B 69/00 |
| 2021/0007281 | A1 * | 1/2021 | Smith | B24B 51/00 |
| 2021/0302999 | A1 | 9/2021 | Yokoyama et al. | |
| 2023/0270044 | A1 * | 8/2023 | Frick | A01D 34/008 56/10.2 R |

FOREIGN PATENT DOCUMENTS

| | | | | |
|---|---|---|---|---|
| CA | 2431753 | C * | 6/2006 | A01D 42/005 |
| CA | 2933386 | C * | 5/2022 | A01D 34/863 |
| EP | 1041871 | B1 * | 10/2009 | A01D 43/14 |
| JP | 08-256522 | A | 10/1996 | |
| JP | 3146127 | B2 * | 3/2001 | |
| JP | 2012-105557 | A | 6/2012 | |
| JP | 2014-103932 | A | 6/2014 | |
| JP | 2017-167910 | A | 9/2017 | |
| JP | 2019106942 | A * | 7/2019 | |
| JP | 2020114226 | A * | 7/2020 | A01D 34/008 |
| JP | 2020-195288 | A | 12/2020 | |
| JP | 6824866 | B2 * | 2/2021 | |
| JP | 2021-158993 | A | 10/2021 | |
| NL | 1033890 | C2 * | 12/2008 | A01D 34/863 |
| WO | WO-9929153 | A1 * | 6/1999 | A01D 43/14 |
| WO | WO-2019124463 | A1 * | 6/2019 | G05D 1/43 |

* cited by examiner

WORK AREA DETERMINATION DEVICE, LAWN MOWING SYSTEM, AND WORK AREA DETERMINATION METHOD

TECHNICAL FIELD

The present invention relates to a work region (work area) determination device, a lawn mowing system, and a work region (work area) determination method, for determining a work region of an autonomous traveling lawn mower.

BACKGROUND ART

JP 2012-105557 A discloses a method of setting a work region of an autonomous traveling lawn mower via a computer.

SUMMARY OF THE INVENTION

According to JP 2012-105557 A, the work region is set through the following procedure. First, the computer displays map data. Next, the user sets a work region on the map data while viewing the map data.

However, a range (lawn-mowing region) in which the lawn mower mows the lawn includes a region having the lawn and a region having an obstacle. The obstacle is, for example, a rock or a pond. Therefore, it is difficult for the user to set, as a work region, a region in which lawn mowing is necessary, while excluding a region having an obstacle.

An object of the present invention is to solve the above-mentioned problem.

A first aspect of the present invention is characterized by a work region determination device including: an acquisition unit configured to acquire a travel trajectory of a lawn mower that has traveled by an operation performed by a human operator; a movement trajectory calculation unit configured to calculate a movement trajectory of a cutter blade of the lawn mower based on the travel trajectory; and a determination unit configured to determine a work region for lawn-mowing that excludes a region where an obstacle is present, based on the movement trajectory.

A second aspect of the present invention is characterized by a lawn mowing system including an autonomous traveling lawn mower and a management server configured to manage a work region of the autonomous traveling lawn mower, wherein the management server includes the work region determination device according to the first aspect.

A third aspect of the present invention is characterized by a work region determination method including: an acquiring step of acquiring a travel trajectory of a lawn mower that has traveled by an operation performed by a human operator; a movement trajectory calculating step of calculating a movement trajectory of a cutter blade of the lawn mower based on the travel trajectory; and a determining step of determining a work region for lawn-mowing that excludes a region where an obstacle is present, based on the movement trajectory.

A fourth aspect of the present invention is characterized by a work region determination program configured to cause a computer to execute the work region determination method according to the third aspect.

According to the aspects of the present invention, it is possible to set, as the work region, a region where lawn mowing is necessary while excluding a region where an obstacle is present.

DETAILED DESCRIPTION OF THE INVENTION

Embodiment

Figure 1:
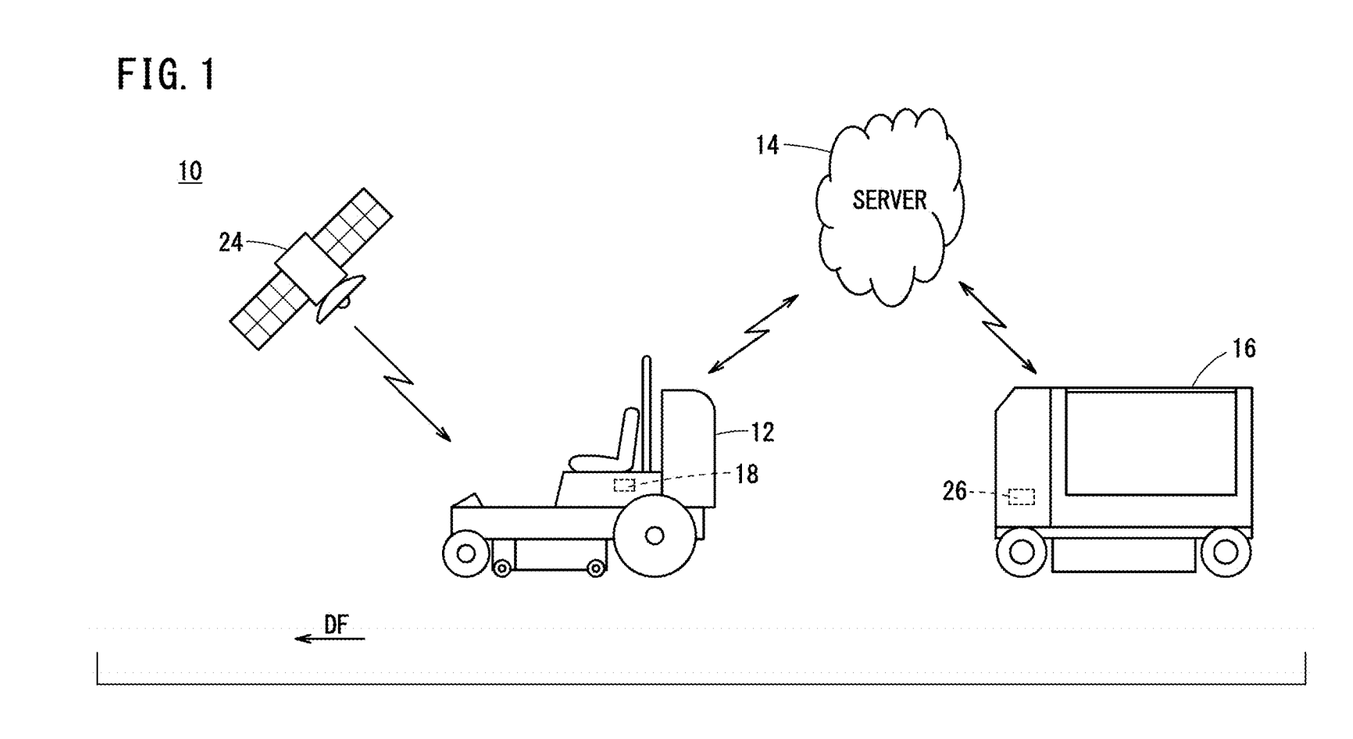
FIG. 1 is a schematic configuration diagram of a lawn mowing system according to an embodiment.

FIG. 1 is a schematic configuration diagram of a lawn mowing system 10 according to an embodiment.

The lawn mowing system 10 includes a human-operated lawn mower 12, a management server 14, and a self-propelled lawn mower 16.

The human-operated lawn mower 12 is a lawn mower that travels in response to an operation performed by a human operator. The human-operated lawn mower 12 includes a position sensor 18, a plurality of cutter blades 20, and a plurality of shaft members 22 (see also FIG. 2). Note that the arrow DF in FIG. 1 indicates the body front direction of the human-operated lawn mower 12.

The position sensor 18 is a device that outputs a signal corresponding to its own coordinates. The position sensor 18 is a position sensor using a GNSS (global navigation satellite system). A specific example of the GNSS is, for example, a GPS (global positioning system). In this case, the position sensor 18 detects the coordinates (latitude/longitude) of the position sensor 18 by communicating with a GPS satellite 24.

The human-operated lawn mower 12 transmits the coordinates of the position sensor 18 to the management server 14. In this regard, the human-operated lawn mower 12 may further include a communication device for communicating with the management server 14, for example. The communication device is not shown.

Figure 2:
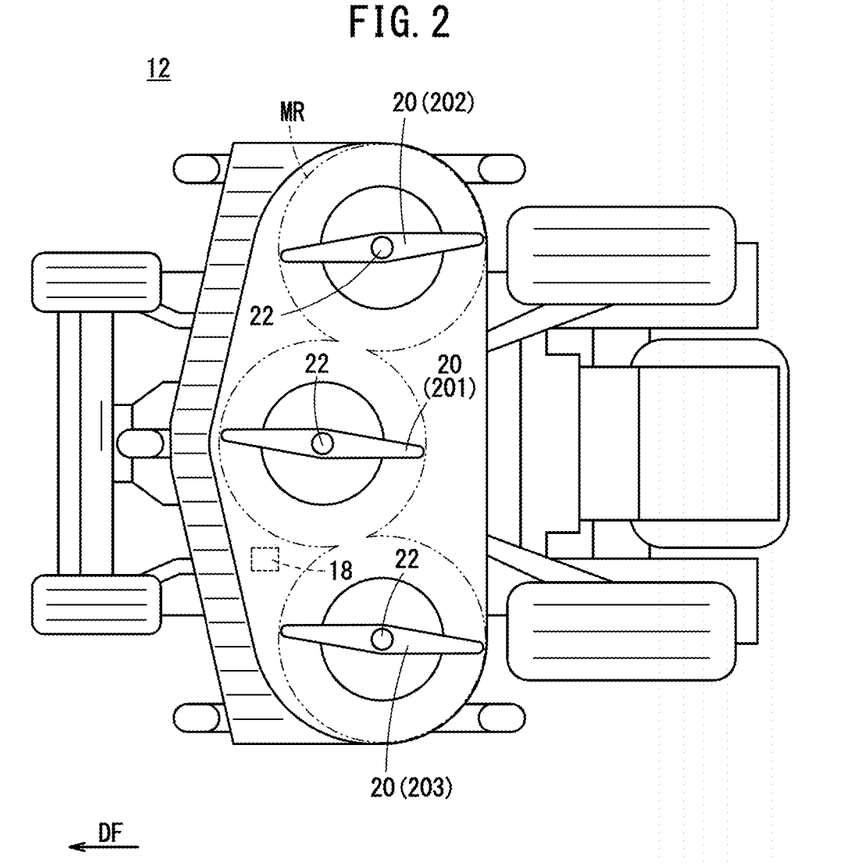
FIG. 2 is a view showing a lower surface of a human-operated lawn mower of FIG. 1 in a simplified manner.

FIG. 2 is a view showing the lower surface of the human-operated lawn mower 12 of FIG. 1 in a simplified manner.

The plurality of cutter blades 20 and the plurality of shaft members 22 are disposed, for example, in a lower portion of the human-operated lawn mower 12.

The plurality of cutter blades 20 are a plurality of cutters for mowing the lawn. The human-operated lawn mower 12 of the present embodiment includes three cutter blades 20 (201, 202, 203).

The plurality of shaft members 22 are a plurality of members for rotating the plurality of cutter blades 20. The number of the shaft members 22 is the same as the number of the cutter blades 20. Therefore, the human-operated lawn mower 12 of the embodiment includes three shaft members 22.

The plurality of cutter blades 20 are attached to the plurality of shaft members 22. Each of the plurality of shaft members 22 is rotatable. The plurality of cutter blades 20 are rotated by the rotation of the plurality of shaft members 22. The lawn is cut within a range MR (indicated by two dot chain line) where the three rotating cutter blades 20 can reach.

The self-propelled lawn mower 16 of FIG. 1 is an autonomous traveling lawn mower. Note that the autonomous traveling lawn mower itself is known in the art. Therefore, the description of the self-propelled lawn mower 16 is kept to a minimum in the following.

The self-propelled lawn mower 16 includes a control computer 26. The control computer 26 is a computer that controls autonomous traveling of the self-propelled lawn mower 16.

The control computer 26 can communicate with the management server 14 through a predetermined network. The management server 14 transmits a travel route of the self-propelled lawn mower 16, which will be described in detail later. The control computer 26 receives the travel route from the management server 14 by communicating with the management server 14. The control computer 26 controls the autonomous traveling of the self-propelled lawn mower 16 based on the received travel route.

Figure 3:
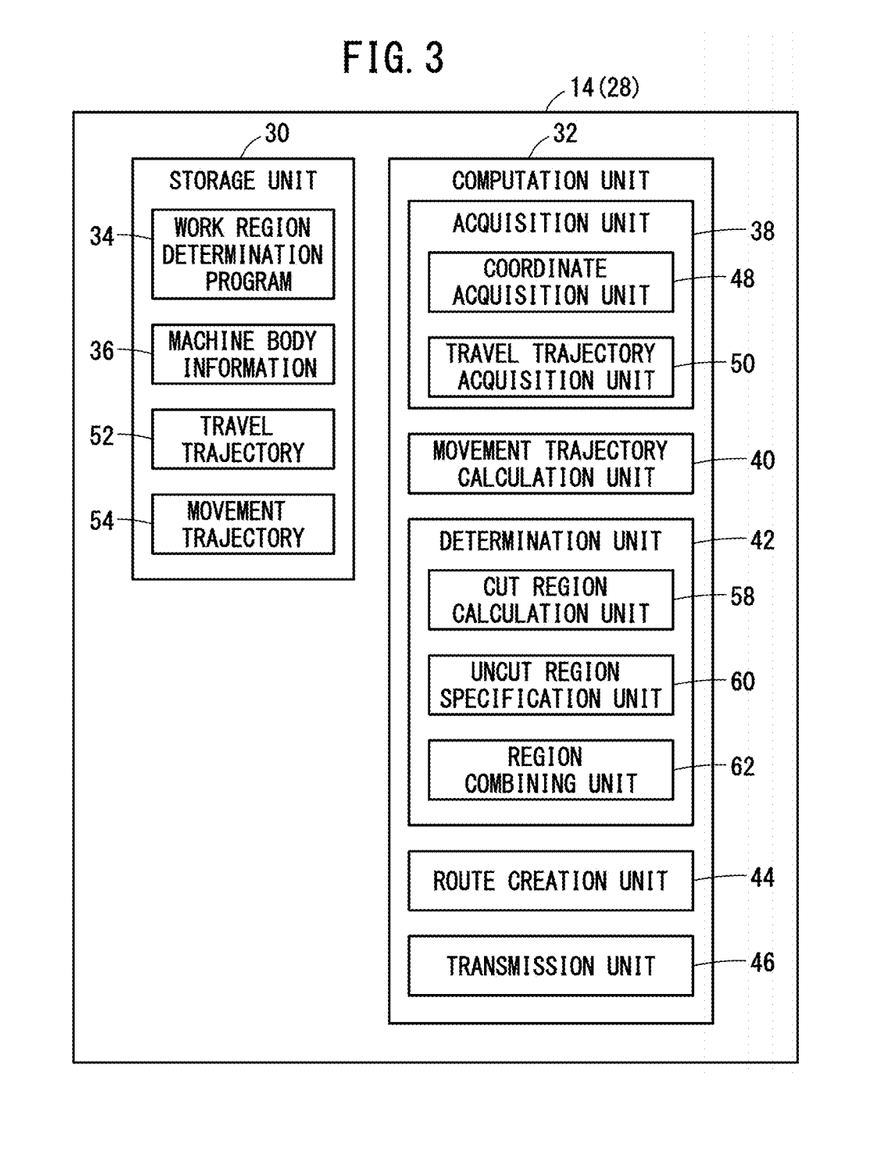
FIG. 3 is a schematic configuration diagram of a management server in FIG. 1.

FIG. 3 is a schematic configuration diagram of the management server 14 of FIG. 1.

The management server 14 is a server device that manages a work region 56 (see FIG. 9) of the self-propelled lawn mower 16. The management server 14 includes a work region determination device 28. The work region determination device 28 is a computer including a storage unit 30 and a computation unit 32.

The storage unit 30 includes one or more memories. For example, the storage unit 30 includes a ROM (read only memory) and a RAM (random access memory).

The storage unit 30 stores a work region determination program 34 and machine body information 36. The work region determination program 34 is a program for causing a computer to execute a work region determination method. The work region determination method will be described later.

The machine body information 36 is information (database) including a relative positional relationship between the position sensor 18 and the three cutter blades 20, and the size of each of the three cutter blades 20. Here, the position of each of the three cutter blades 20 is preferably the position of the corresponding shaft member 22. This is because the positions of the three shaft members 22 are constant regardless of the rotation of the corresponding cutter blades 20. That is, determination of the relative positional relationship between the position sensor 18 and the three cutter blades 20 can be performed stably.

The computation unit 32 includes one or more processors. For example, the computation unit 32 includes a CPU (central processing unit) and a GPU (graphics processing unit). The computation unit 32 can refer to data stored in the storage unit 30.

The computation unit 32 includes an acquisition unit 38, a movement trajectory calculation unit 40, a determination unit 42, a route creation unit 44, and a transmission unit 46. The acquisition unit 38, the movement trajectory calculation unit 40, the determination unit 42, the route creation unit 44, and the transmission unit 46 are realized by the computation unit 32 executing the work region determination program 34.

The acquisition unit 38 includes a coordinate acquisition unit 48 and a travel trajectory acquisition unit 50.

The coordinate acquisition unit 48 receives a plurality of coordinates of the position sensor 18 from the human-operated lawn mower 12.

The travel trajectory acquisition unit 50 acquires the movement trajectory of the position sensor 18 as a travel trajectory 52 of the human-operated lawn mower 12. The travel trajectory 52 is a trajectory followed by the position sensor 18 (human-operated lawn mower 12) during the period of lawn mowing using the human-operated lawn mower 12. The travel trajectory 52 can be acquired based on the plurality of coordinates.

Figure 4:
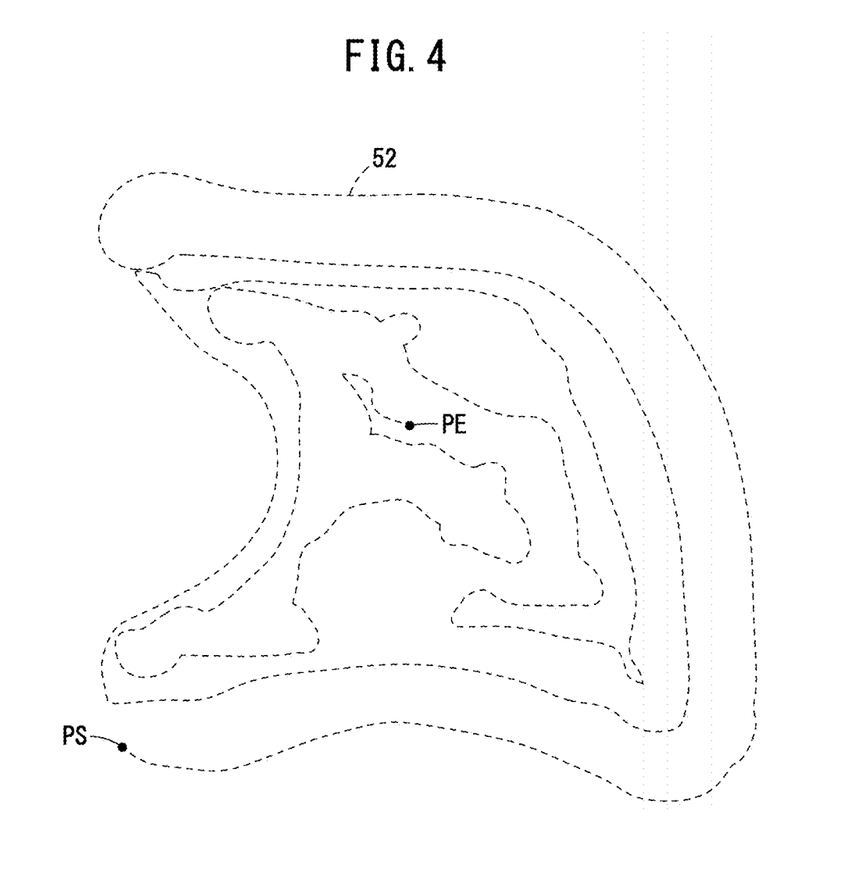
FIG. 4 is a view showing an example of a travel trajectory of the human-operated lawn mower.

FIG. 4 is a view showing an example of the travel trajectory 52 of the human-operated lawn mower 12.

The travel trajectory acquisition unit 50 acquires, for example, the travel trajectory 52 illustrated in FIG. 4.

A point PS in FIG. 4 is, for example, a point at which the user of the human-operated lawn mower 12 has operated a predetermined switch to start mowing using the human-operated lawn mower 12. That is, the point PS indicates a travel start point of the human-operated lawn mower 12.

A point PE in FIG. 4 is, for example, a point at which the user of the human-operated lawn mower 12 operates a predetermined switch to end the mowing using the human-operated lawn mower 12. That is, the point PE indicates a travel end point of the human-operated lawn mower 12.

The storage unit 30 may store the acquired travel trajectory 52.

The movement trajectory calculation unit 40 calculates the movement trajectories 54 of the cutter blades 20 based on the travel trajectory 52 and the machine body information 36. The human-operated lawn mower 12 includes three cutter blades 20. In this case, the movement trajectory 54 includes three trajectories (a movement trajectory 541, a movement trajectory 542, and a movement trajectory 543) corresponding to the number of the cutter blades 20.

Figure 5:
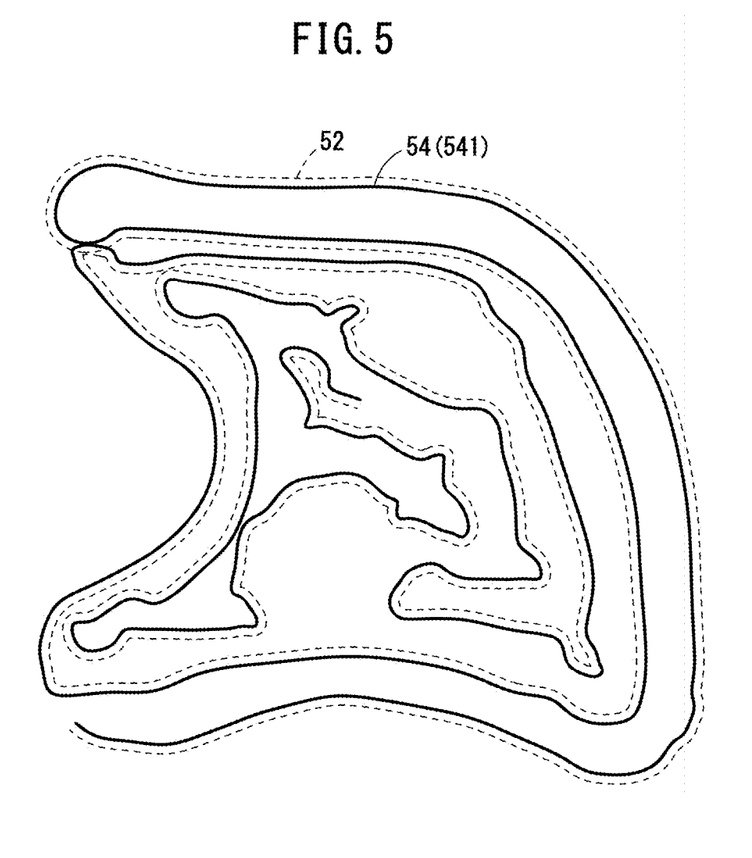
FIG. 5 is a diagram illustrating a movement trajectory of one of the three cutter blades and the travel trajectory of FIG. 4.

FIG. 5 is a diagram illustrating a movement trajectory 541 of one cutter blade 201 of the three cutter blades 20 and the travel trajectory 52 of FIG. 4.

The movement trajectory calculation unit 40 calculates a trajectory that is offset (shifted) from the travel trajectory 52 in accordance with, for example, the relative positional relationship between the position sensor 18 and the cutter blade 201. The calculated trajectory is the movement trajectory 541 of the cutter blade 201.

Similarly, the movement trajectory calculation unit 40 further calculates a movement trajectory 542 of the cutter blade 202 and a movement trajectory 543 of the cutter blade 203. The movement trajectory 542 is a trajectory offset (shifted) from the travel trajectory 52 in accordance with the relative positional relationship between the position sensor 18 and the cutter blade 202. The movement trajectory 543 is a trajectory offset (shifted) from the travel trajectory 52 in accordance with the relative positional relationship between the position sensor 18 and the cutter blade 203.

The movement trajectory calculation unit 40 may calculate at least one of the three movement trajectories 54 based on the other movement trajectories 54. For example, the movement trajectory calculation unit 40 may calculate the movement trajectory 542 by offsetting the movement trajectory 541 in accordance with the relative positional relationship between the cutter blade 201 and the cutter blade 202.

Figure 6:
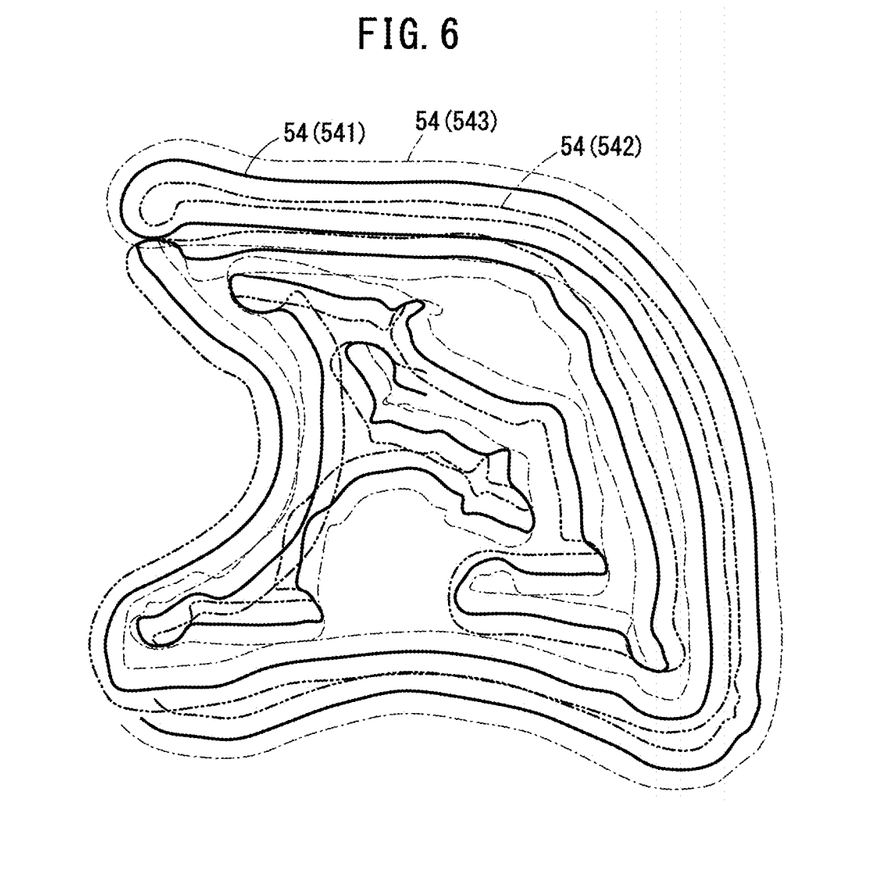
FIG. 6 is a diagram illustrating the movement trajectories of the three cutter blades.

FIG. 6 is a diagram illustrating the movement trajectories 54 (541, 542, 543) of the three cutter blades 20, as an example.

According to the present embodiment, three movement trajectories 54 (541, 542, 543) are calculated based on one travel trajectory 52. It is preferable that any one of the three cutter blades 20 (201, 202, 203) and the position sensor 18 should be relatively at the same position. For example, it is preferable that the cutter blade 201 and the position sensor 18 should be relatively at the same position. In this case, the travel trajectory 52 and the movement trajectory 541 coincide with each other. That is, the travel trajectory 52 can be regarded as the movement trajectory 541 as it is. Therefore, the process of calculating the movement trajectory 541 can be substantially omitted. That is, the processing load of the movement trajectory calculation unit 40 is reduced.

The determination unit 42 determines a work region 56 for lawn-mowing excluding a region where an obstacle is present, based on the movement trajectory 54. In this regard, the determination unit 42 includes a cut region calculation unit 58, an uncut region specification unit (specification unit) 60, and a region combining unit (combining unit) 62.

The cut region calculation unit 58 calculates a cut region 561 (a region where the lawn has been mown by the human-operated lawn mower 12).

Figure 7:
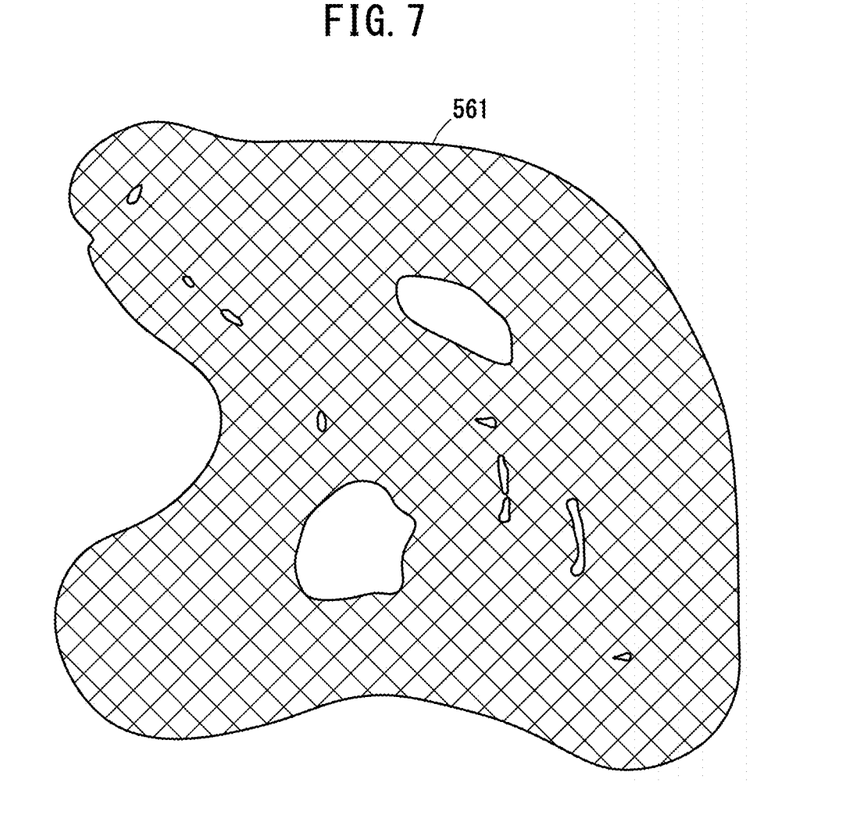
FIG. 7 is a diagram showing a cut region calculated based on the three movement trajectories shown in FIG. 6.

FIG. 7 is a diagram showing the cut region 561 calculated based on the three movement trajectories 54 of FIG. 6. The crosshatched portion in FIG. 7 indicates the cut region 561.

The cut region 561 indicates a range that the three cutter blades 20 moving along the three movement trajectories 54 can reach. The cut region 561 can be calculated based on the three movement trajectories 54 and the sizes of the three cutter blades 20.

The uncut region specification unit 60 specifies an uncut region 562.

Figure 8:
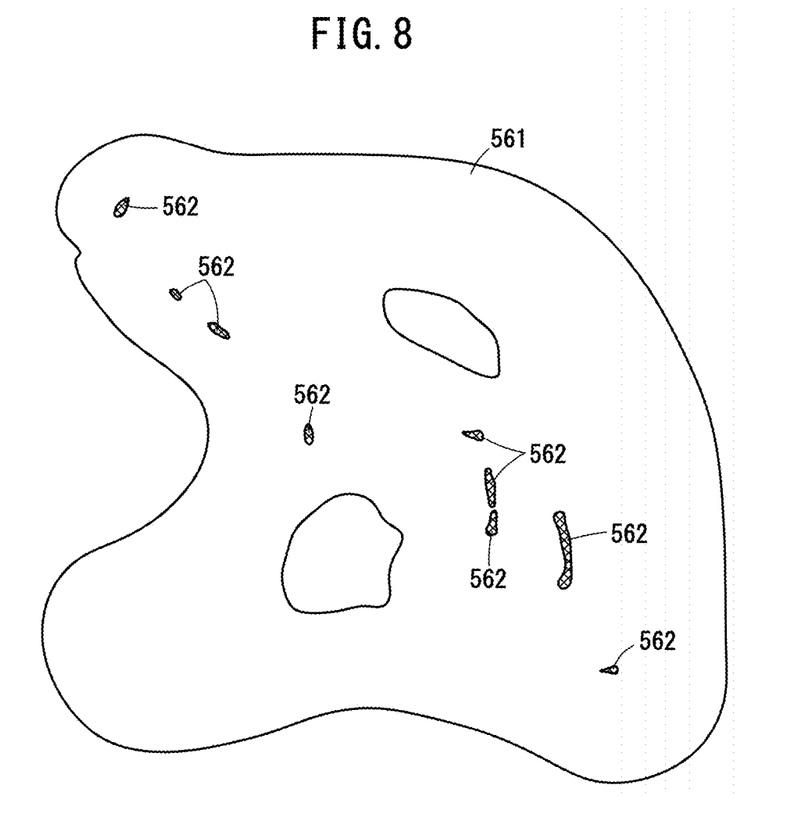
FIG. 8 is a diagram showing an uncut region specified based on the cut region in FIG. 7.

FIG. 8 is a diagram showing an uncut region 562 specified based on the cut region 561 in FIG. 7. The crosshatched portion in FIG. 8 indicates the uncut region 562.

The uncut region 562 is a region that is other than the cut region 561 and smaller than a predetermined area. The uncut region 562 is a region that is surrounded by the cut region 561. In a case where there are a plurality of regions corresponding to the uncut region 562, the uncut region specification unit 60 specifies the plurality of regions as a plurality of uncut regions 562.

The small region surrounded by the cut region 561 is likely of being a region where a person using the human-operated lawn mower 12 has forgotten to mow the lawn. In view of this, the specific size of the predetermined area is determined in advance by experiments. The predetermined area is, for example, an area smaller than the area of the range MR illustrated in FIG. 2.

The region combining unit 62 calculates the work region 56 by combining the cut region 561 and the uncut region 562. Thus, the work region 56 is determined.

Figure 9:
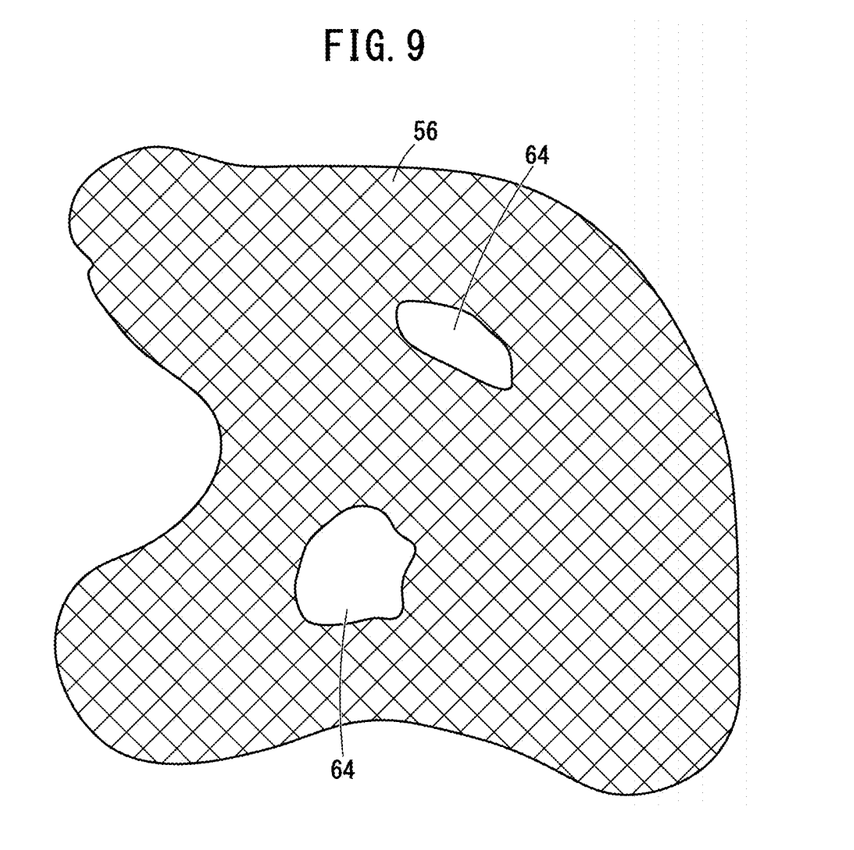
FIG. 9 is a diagram showing a work region obtained by combining together the cut region in FIG. 7 and the uncut region in FIG. 8.

FIG. 9 is a diagram showing a work region 56 obtained by combining together the cut region 561 of FIG. 7 and the uncut region 562 of FIG. 8. The crosshatched portion in FIG. 9 indicates the work region 56.

The work region 56 calculated by the region combining unit 62 includes the cut region 561. The cut region 561 is a region calculated based on the movement trajectories 54 of the three cutter blades 20. Therefore, the cut region 561 does not include a region through which the three cutter blades 20 cannot pass. That is, the cut region 561 does not include the region 64 (see FIG. 9) where an obstacle is present. The obstacle is, for example, a pond or a rock.

The region combining unit 62 causes the uncut region 562 smaller than the predetermined area, as described above, to be included in the work region 56. Thus, a small region that has not been subjected to lawn mowing due to work omission can be included in the work region 56.

The route creation unit 44 creates a travel route of the self-propelled lawn mower 16 based on the work region 56. The storage unit 30 may store the machine body specifications of the self-propelled lawn mower 16. The machine body specifications include, for example, the size of the cutter blade of the self-propelled lawn mower 16. In a case where the self-propelled lawn mower 16 includes a plurality of cutter blades, the machine specifications of the self-propelled lawn mower 16 may further include the relative positional relationship between the plurality of cutter blades of the self-propelled lawn mower 16. The route creation unit 44 may refer to the machine body specifications of the self-propelled lawn mower 16 as appropriate in order to create the travel route of the self-propelled lawn mower 16.

The transmission unit 46 transmits the travel route created by the route creation unit 44 to the control computer 26 of the self-propelled lawn mower 16. Thus, the self-propelled lawn mower 16 can autonomously travel based on the travel route.

Figure 10:
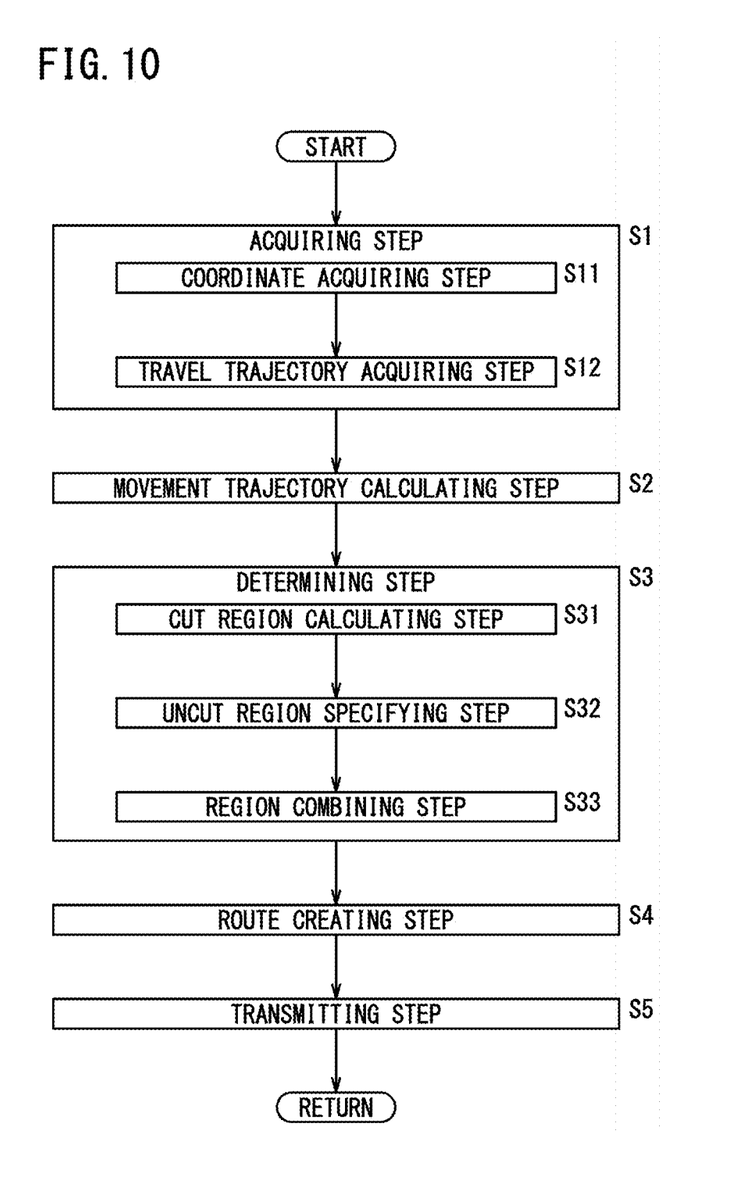
FIG. 10 is a flowchart illustrating the process flow of a work region determination method according to the embodiment.

FIG. 10 is a flowchart illustrating the process flow of the work region determination method according to the embodiment.

The management server 14 described above can execute the work region determination method of FIG. 10. The work region determination method of FIG. 10 includes an acquiring step S1, a movement trajectory calculating step S2, a determining step S3, a route creating step S4, and a transmitting step S5.

The acquiring step S1 includes a coordinate acquiring step S11 and a travel trajectory acquiring step S12.

In the coordinate acquiring step S11, the coordinate acquisition unit 48 acquires a plurality of coordinates from the position sensor 18 provided in the human-operated lawn mower 12.

The travel trajectory acquiring step S12 is executed after the coordinate acquiring step S11. In the travel trajectory acquiring step S12, the travel trajectory acquisition unit 50 acquires the travel trajectory 52 of the human-operated lawn mower 12 based on the plurality of coordinates.

The human-operated lawn mower 12 may sequentially transmit a plurality of coordinates that follow the route from the point PS to the point PE. The travel trajectory acquisition unit 50 may acquire the travel trajectory 52 by sequentially acquiring the plurality of coordinates that have been sequentially transmitted.

The movement trajectory calculating step S2 is executed after the travel trajectory acquiring step S12. In the movement trajectory calculating step S2, the movement trajectory calculation unit 40 calculates the movement trajectory 54 of the cutter blade 20 provided in the human-operated lawn mower 12. The movement trajectory 54 of the cutter blade 20 is calculated based on the relative positional relationship between the position sensor 18 and the cutter blade 20, and the travel trajectory 52. When the human-operated lawn mower 12 includes a plurality of cutter blades 20, the movement trajectory calculation unit 40 calculates the movement trajectories 54 of the plurality of cutter blades 20.

The determining step S3 includes a cut region calculating step S31, an uncut region specifying step (specifying step) S32, and a region combining step (combining step) S33.

The cut region calculating step S31 is executed after the movement trajectory calculating step S2. In the cut region calculating step S31, the cut region calculation unit 58 calculates the cut region 561. The cut region 561 is calculated based on the movement trajectory 54 of the cutter blade 20 and the size of the cutter blade 20.

The uncut region specifying step S32 is executed after the cut region calculating step S31. In the uncut region specifying step S32, the uncut region specification unit 60 specifies the uncut region 562. The uncut region 562 is a region that is surrounded by the cut region 561 and other than the cut region 561. Further, the uncut region 562 is a region having an area smaller than a predetermined area.

The region combining step S33 is executed after the uncut region specifying step S32. In the region combining step S33, the region combining unit 62 combines the cut region 561 and the uncut region 562 to calculate the work region 56.

The route creating step S4 is executed after the region combining step S33. In the route creating step S4, the route creation unit 44 creates a travel route of the self-propelled lawn mower 16 based on the work region 56, the size of the cutter blade of the self-propelled lawn mower 16, and the arrangement of the cutter blade of the self-propelled lawn mower 16. In a case where the self-propelled lawn mower 16 includes a plurality of cutter blades, the route creation unit 44 may create the travel route of the self-propelled lawn mower 16 by further considering the relative positional relationship between the plurality of cutter blades.

The transmitting step S5 is executed after the route creating step S4. In the transmitting step S5, the transmission unit 46 transmits the travel route to the control computer 26 of the self-propelled lawn mower 16.

According to the work region determination method described above, it is possible to set the work region 56 in which lawn mowing is necessary while excluding the region 64 in which an obstacle is present.

MODIFICATIONS

Modifications of the above-described embodiment will be described below. However, description overlapping with the description of the above embodiment will be omitted as much as possible in the following description. Components that have already been described in the above embodiment are denoted by the same reference numerals as in the above embodiment, unless otherwise indicated.

Modification 1

The number and arrangement of the cutter blades 20 are not limited to the example in the present embodiment. For example, existing mower designs with respect to the number and arrangement of cutter blades 20 may be used for the human-operated lawn mower 12.

Modification 2

The self-propelled lawn mower 16 may have a function of creating a travel route of the self-propelled lawn mower 16 based on the work region 56. In this case, the work region determination device 28 may not execute the route creating step S4. In this case, the work region determination device 28 may transmit the work region 56 to the self-propelled lawn mower 16 in the transmitting step S5.

Modification 3

Figure 11:
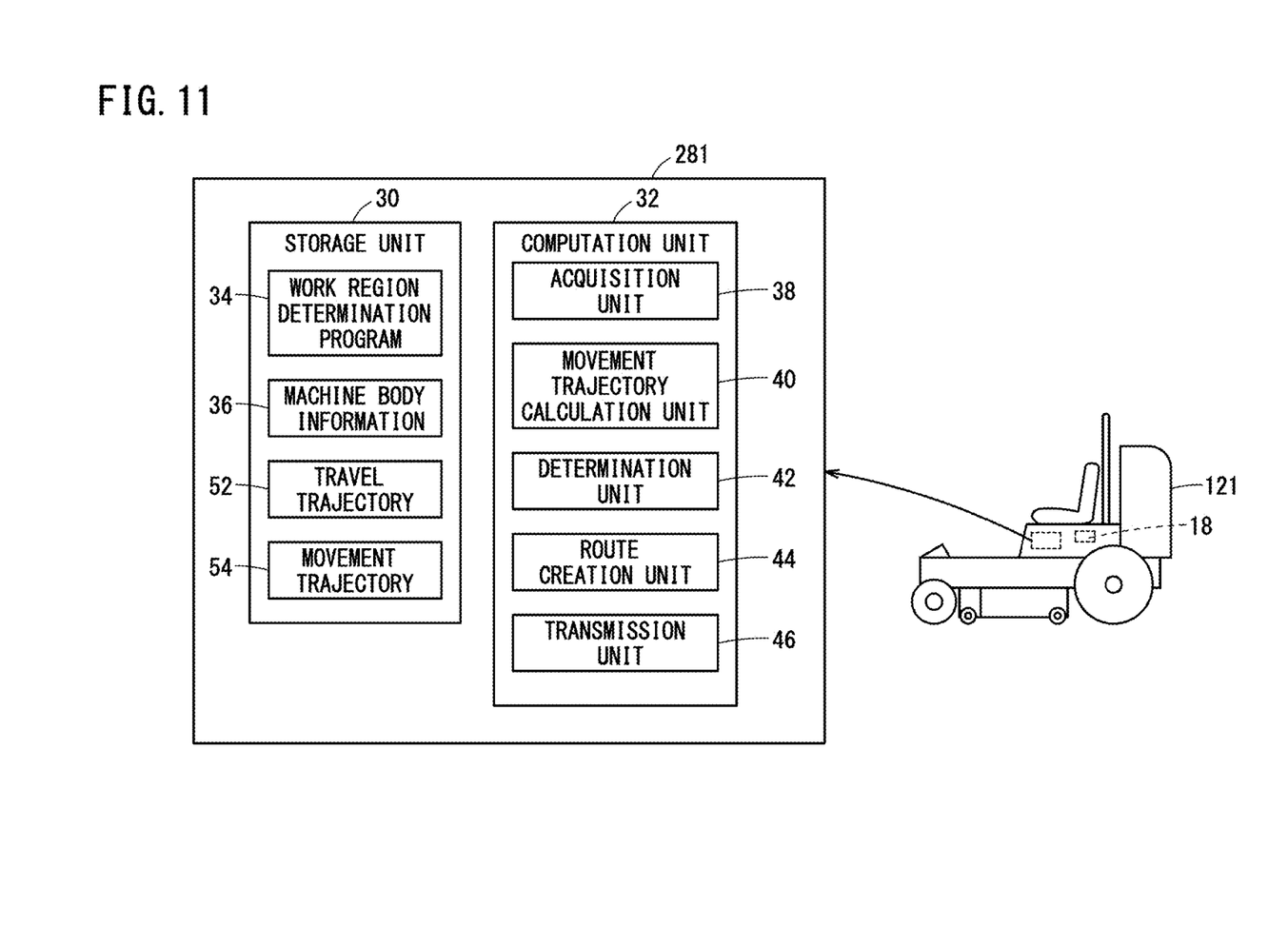
FIG. 11 is a schematic configuration diagram of a human-operated lawn mower according to a third modification.

FIG. 11 is a schematic configuration diagram of a human-operated lawn mower 121 according to a third modification.

The human-operated lawn mower 121 includes the position sensor 18 and a work region determination device 281. The work region determination device 281 includes the same components as the work region determination device 28 of the embodiment (see also FIG. 3). The position sensor 18 inputs an output signal of the position sensor 18 to the work region determination device 281. In short, the work region determination device 281 may not be a server device remotely installed away from the lawn mower (the human-operated lawn mower 12 or the self-propelled lawn mower 16).

Further, each of the calculation of the movement trajectory 54, the calculation of the work region 56, and the creation of the travel route of the self-propelled lawn mower 16 may be performed by any one of the human-operated lawn mower 12 (121), the management server 14, and the self-propelled lawn mower 16.

Modification 4

The storage medium for storing the work region determination program 34 is not limited to the memory (storage unit 30) built in the work region determination device 28. The work region determination program 34 may be stored in an external storage medium of the work region determination device 28 as long as the work region determination device 28 can read the work region determination program 34.

The external storage medium is, for example, a USB (universal serial bus) memory or an optical disk. The work region determination device 28 (281) may read the work region determination program 34 from an external storage medium.

Modification 5

The acquiring step S1, the movement trajectory calculating step S2, and the determining step S3 may be executed in parallel. For example, the travel trajectory 52 may be sequentially created based on a plurality of coordinates that have been sequentially acquired. The movement trajectory 54 may be sequentially calculated as the travel trajectory 52 is sequentially created. The work region 56 may be sequentially calculated as the movement trajectory 54 is sequentially calculated.

According to the present modification, the work region 56 is calculated in parallel with traveling of the human-operated lawn mower 12 from the point PS to the point PE.

Note that the present invention is not limited to the above-described embodiment and modifications, and various configurations can be adopted without departing from the gist of the present invention.

Invention Obtained from Embodiment

The invention that can be grasped from the above-described embodiment and modifications will be described below.

First Aspect

A first aspect of the present invention is characterized by the work region determination device (28) including: the acquisition unit (38) configured to acquire the travel trajectory (52) of the lawn mower (12) that has traveled by an operation performed by a human operator; the movement trajectory calculation unit (40) configured to calculate the movement trajectory (54) of the cutter blade (20) of the lawn mower based on the travel trajectory; and the determination unit (42) configured to determine the work region (56) for lawn-mowing that excludes the region where an obstacle is present, based on the movement trajectory.

With this configuration, it is possible to set, as the work region, a region where lawn mowing is necessary while excluding a region where an obstacle is present.

In the work region determination device according to the first aspect of the present invention, the acquisition unit may acquire the travel trajectory based on an output signal of a position sensor (18) provided in the lawn mower, and the movement trajectory calculation unit may calculate the movement trajectory based on a relative positional relationship between the position sensor and the cutter blade, and the travel trajectory. With this configuration, the calculated movement trajectory indicates the trajectory followed by the cutter blade more accurately.

In the work region determination device according to the first aspect, the lawn mower may include the plurality of cutter blades, and the movement trajectory calculation unit may calculate the plurality of movement trajectories for the plurality of cutter blades based on the travel trajectory. With this configuration, a plurality of movement trajectories for the plurality of cutter blades are calculated based on one travel trajectory.

In the work region determination device according to the first aspect, the determination unit may include: the cut region calculation unit (58) configured to calculate the cut region (561) based on the movement trajectory and the sizes of the cutter blades; the specification unit (60) configured to specify a region that is other than the cut region and smaller than the predetermined area, as the uncut region (562); and the combining unit (62) configured to combine the cut region and the uncut region together, and a region obtained by combining performed by the combining unit may be determined as the work region. With this configuration, it is possible to include, in the work region, a small region that has not been subjected to lawn mowing due to work omission.

In the work region determination device according to the first aspect, the specification unit may specify a region surrounded by the cut region, as the uncut region. With this configuration, it is possible to include, in the work region, a small region that has not been subjected to lawn mowing due to work omission.

Second Aspect

A second aspect of the present invention is characterized by the lawn mowing system (10) including the autonomous traveling lawn mower (16) and the management server (14) configured to manage the work region (56) of the autonomous traveling lawn mower, wherein the management server includes the work region determination device according to the first aspect.

With this configuration, it is possible to set, as the work region, a region where lawn mowing is necessary while excluding a region where an obstacle is present. Further, since the human-operated lawn mower (the lawn mower) or the autonomous traveling lawn mower does not calculate the work region, the processing load of the human-operated lawn mower or the autonomous traveling lawn mower is reduced.

In the lawn mowing system of the second aspect, the management server may include the transmission unit (46) configured to transmit the work region that has been determined, to the autonomous traveling lawn mower, and the autonomous traveling lawn mower may determine the travel route of the autonomous traveling lawn mower itself, based on the work region that has been received. With this configuration, the autonomous traveling lawn mower can autonomously travel while avoiding obstacles.

In the lawn mowing system of the second aspect, the management server may include: the route creation unit (44) configured to create the travel route of the autonomous traveling lawn mower based on the work region that has been determined; and the transmission unit (46) configured to transmit the travel route to the autonomous traveling lawn mower. With this configuration, the autonomous traveling lawn mower can autonomously travel while avoiding obstacles. Further, since the autonomous traveling lawn mower does not create a travel route, the processing load of the autonomous traveling lawn mower is reduced.

Third Aspect

A third aspect of the present invention is characterized by the work region determination method including: the acquiring step (S1) of acquiring the travel trajectory (52) of the lawn mower (12) that has traveled by an operation performed by a human operator; the movement trajectory calculating step (S2) of calculating the movement trajectory (54) of the cutter blade (20) of the lawn mower based on the travel trajectory; and the determining step (S3) of determining the work region (56) for lawn-mowing that excludes a region where an obstacle is present, based on the movement trajectory.

With this configuration, it is possible to set, as the work region, a region where lawn mowing is necessary while excluding a region where an obstacle is present.

In the work region determination method of the third aspect, in the acquiring step, the travel trajectory may be acquired based on an output signal of the position sensor (18) provided in the lawn mower, and in the movement trajectory calculating step, the movement trajectory may be calculated based on the relative positional relationship between the position sensor and the cutter blade, and the travel trajectory. With this configuration, the calculated movement trajectory indicates the trajectory followed by the cutter blade more accurately.

In the work region determination method of the third aspect, the lawn mower may include the plurality of cutter blades, and in the movement trajectory calculating step, the plurality of movement trajectories of the plurality of cutter blades may be calculated based on the travel trajectory. With this configuration, a plurality of movement trajectories for the plurality of cutter blades are calculated based on one travel trajectory.

In the work region determination method of the third aspect, the determining step may include: the cut region calculating step (S31) of calculating the cut region (561) based on the movement trajectory and the sizes of the cutter blades; the specifying step (S32) of specifying the region that is other than the cut region and smaller than the predetermined area, as the uncut region (562); and the combining step (S33) of combining the cut region and the uncut region together, and a region obtained by combining performed in the combining step may be determined as the work region. With this configuration, it is possible to include, in the work region, a small region that has not been subjected to lawn mowing due to work omission.

In the work region determination method of the third aspect, in the specifying step, a region surrounded by the cut region may be specified as the uncut region. With this configuration, it is possible to include, in the work region, a small region that has not been subjected to lawn mowing due to work omission.

The work region determination method of the third aspect may further include the transmitting step (S5) of transmitting the work region that has been determined, to the autonomous traveling lawn mower (16). With this configuration, the autonomous traveling lawn mower can autonomously travel while avoiding obstacles.

The work region determination method of the third aspect may further include: the route creating step (S4) of creating the travel route of the autonomous traveling lawn mower (16) based on the work region that has been determined; and the transmitting step (S5) of transmitting the travel route to the autonomous traveling lawn mower. With this configuration, the autonomous traveling lawn mower can autonomously travel while avoiding obstacles. Further, since the autonomous traveling lawn mower does not create a travel route, the processing load of the autonomous traveling lawn mower is reduced.

Fourth Aspect

A fourth aspect of the present invention is characterized by the work region determination program (34) configured to cause the computer (28) to execute the work region determination method according to the third aspect.

With this configuration, the computer can set, as the work region, the region where lawn mowing is necessary while excluding the region where an obstacle is present.

REFERENCE SIGNS LIST

10: lawn mowing system
12, 121: lawn mower
14: management server
16: autonomous traveling lawn mower
18: position sensor
20: cutter blade
28, 281: work region determination device (computer)
34: work region determination program
38: acquisition unit
40: movement trajectory calculation unit
42: determination unit
44: route creation unit
46: transmission unit
52: travel trajectory
54: movement trajectory
56: work region
58: cut region calculation unit
60: specification unit
62: combining unit
561: cut region
562: uncut region

The invention claimed is:

1. A work region determination device comprising:
one or more processors that execute computer-executable instructions stored in a memory, wherein the one or more processors execute the computer-executable instructions to cause the work region determination device to:
acquire a travel trajectory of a lawn mower that has traveled by an operation performed by a human operator;
calculate a movement trajectory of a cutter blade of the lawn mower based on the travel trajectory; and
determine a work region for lawn-mowing that excludes a region where an obstacle is present, based on the movement trajectory.

2. The work region determination device according to claim 1, wherein
the one or more processors further cause the work region determination device to:
acquire the travel trajectory based on an output signal of a position sensor provided in the lawn mower; and
calculate the movement trajectory based on a relative positional relationship between the position sensor and the cutter blade, and the travel trajectory.

3. The work region determination device according to claim 1, wherein
the lawn mower includes a plurality of the cutter blades, and
the one or more processors further cause the work region determination device to calculate a plurality of the movement trajectories for the plurality of cutter blades based on the travel trajectory.

4. The work region determination device according to claim 3, wherein
the one or more processors further cause the work region determination device to:
calculate a cut region based on the movement trajectory and sizes of the cutter blades;
specify a region that is other than the cut region and smaller than a predetermined area, as an uncut region; and
combine the cut region and the uncut region together; and
determine a region obtained by combining as the work region.

5. The work region determination device according to claim 4, wherein
the one or more processors further cause the work region determination device to specify a region surrounded by the cut region, as the uncut region.

6. A lawn mowing system comprising an autonomous traveling lawn mower and a management server configured to manage a work region of the autonomous traveling lawn mower,
wherein the management server includes the work region determination device according to claim 1.

7. The lawn mowing system according to claim 6, wherein
the management server includes one or more processors that execute computer-executable instructions stored in a memory, wherein the one or more processors of the management server execute the computer-executable instructions to cause the management server to:
transmit the work region that has been determined, to the autonomous traveling lawn mower, and
the autonomous traveling lawn mower determines a travel route of the autonomous traveling lawn mower itself, based on the work region that has been received.

8. The lawn mowing system according to claim 6, wherein
the one or more processors of the management server further cause the management server to:
create a travel route of the autonomous traveling lawn mower based on the work region that has been determined; and
transmit the travel route to the autonomous traveling lawn mower.

9. A work region determination method comprising:
acquiring a travel trajectory of a lawn mower that has traveled by an operation performed by a human operator;

calculating a movement trajectory of a cutter blade of the lawn mower based on the travel trajectory; and determining a work region for lawn-mowing that excludes a region where an obstacle is present, based on the movement trajectory.

10. The work region determination method according to claim 9, wherein in the acquiring of the travel trajectory, the travel trajectory is acquired based on an output signal of a position sensor provided in the lawn mower, and in the calculating of the movement trajectory, the movement trajectory is calculated based on a relative positional relationship between the position sensor and the cutter blade, and the travel trajectory.

11. The work region determination method according to claim 9, wherein the lawn mower includes a plurality of the cutter blades, and in the calculating of the movement trajectory, a plurality of the movement trajectories of the plurality of cutter blades are calculated based on the travel trajectory.

12. The work region determination method according to claim 11, wherein the determining of the work region includes:

calculating a cut region based on the movement trajectory and sizes of the cutter blades;

specifying a region that is other than the cut region and smaller than a predetermined area, as an uncut region; and combining the cut region and the uncut region together, and wherein a region obtained by combining performed in the combining is determined as the work region.

13. The work region determination method according to claim 12, wherein in the specifying, a region surrounded by the cut region is specified as the uncut region.

14. The work region determination method according to claim 9, further comprising:

transmitting the work region that has been determined, to an autonomous traveling lawn mower.

15. The work region determination method according to claim 9, further comprising:

creating a travel route of an autonomous traveling lawn mower based on the work region that has been determined; and transmitting the travel route to the autonomous traveling lawn mower.

* * * * *